US006429803B1

(12) United States Patent
Kumar

(10) Patent No.: US 6,429,803 B1
(45) Date of Patent: Aug. 6, 2002

(54) MAGNETIC BEAM DEFLECTION DEVICES

(75) Inventor: Balbir Kumar, Wembley (GB)

(73) Assignee: BAE Systems Electronics Limited, Stanmore (GB)

( * ) Notice: Subject to any disclaimer, the term of this patent is extended or adjusted under 35 U.S.C. 154(b) by 0 days.

(21) Appl. No.: 09/581,598

(22) PCT Filed: Dec. 11, 1998

(86) PCT No.: PCT/GB98/03722

§ 371 (c)(1),
(2), (4) Date: Jul. 31, 2000

(87) PCT Pub. No.: WO99/31759

PCT Pub. Date: Jun. 24, 1999

(30) Foreign Application Priority Data

Dec. 17, 1997 (GB) ........................................... 9726637

(51) Int. Cl.[7] .......................... G01S 13/93; H01Q 3/26
(52) U.S. Cl. ........................... 342/70; 342/73; 342/74; 342/81; 342/368
(58) Field of Search ............................ 342/70, 71, 72, 342/368–377, 73–81, 147, 149, 155–158; 343/700 MS, 711, 713, 715, 745, 746, 787; 333/24.1, 24.2, 24.3, 156, 157–164

(56) References Cited

U.S. PATENT DOCUMENTS

| | | | | |
|---|---|---|---|---|
| 2,939,142 A | | 5/1960 | Fernsler | |
| 3,369,242 A | | 2/1968 | Johnson | |
| 3,765,024 A | | 10/1973 | Chiron et al. | |
| 4,342,033 A | | 7/1982 | de Camargo | |
| 5,206,655 A | * | 4/1993 | Caille et al. | 343/700 MS |
| 5,515,059 A | | 5/1996 | How et al. | |

FOREIGN PATENT DOCUMENTS

| | | |
|---|---|---|
| EP | 0 505 040 A1 | 9/1992 |
| GB | 2 175 455 | 11/1986 |
| GB | 2 253 947 A | 9/1992 |
| WO | WO 84/01669 A1 | 4/1984 |
| WO | WO 92/16031 A1 | 9/1992 |

* cited by examiner

*Primary Examiner*—Bernarr E. Gregory
(74) *Attorney, Agent, or Firm*—Kirschstein, et al.

(57) ABSTRACT

A device for changing the divergence of a beam of microwave radiation comprises a ferrite body having an aperture through which the beam passes. Magnetic wires pass both through the body and across the aperture, or a magnetic coil on either side of the aperture, causes a differential phase delay as the beam passes through the aperture which broadens or narrows the beam.

24 Claims, 5 Drawing Sheets

MAGNETIC BEAM DEFLECTION DEVICES

BACKGROUND OF THE INVENTION

This invention relates to a device which is adapted to be positioned in the path of a beam of electromagnetic radiation propagating in free space which changes characteristics of the beam. The invention is particularly, but not exclusively, concerned with microwave devices.

The term microwave refers to the part of the electromagnetic spectrum substantially in the frequency range 0.2 to 300 GHz. It includes that part of the spectrum referred to as millimetre wave (having a frequency in the range 30 to 300 GHz).

It is known from EP 0505040 to steer the direction of a microwave beam using a scanning device that comprises a body of ferrite material having a first magnetic coil along a first side of the body and a second magnetic coil along a second, opposite, side of the body. Each coil generates a magnetic field which passes through faces of the body. The device is configured such that magnetic field from each coil passes through the body in opposite directions. This causes a gradient in magnetisation across the body. The direction of the beam leaving the device is perpendicular to the gradient in the magnetic field across the body. Therefore the degree of deflection of the beam is controlled by the gradient in the magnetisation.

One application for such a device is in a control system for automatic or semi-automatic control of a vehicle. Such a control system comprises a radar system to determine location and speed of a vehicle relative to other vehicles and other objects or features, for example roadside furniture. This enables the control system to operate the vehicle automatically in cruise control and collision avoidance modes.

The radar system uses a microwave beam of narrow beam width having a half-power (3 dB) beam width of 2° to 4°. A narrow beam width is used in order that, when reflected from other vehicles, a relatively strong usable signal is available for processing. Furthermore, a narrow beam width is necessary for angular location of obstacles. Whilst a narrow beam width is useful for vehicle speeds which are normal for road travel, for example 15 to 100 km/hour, it is less useful for manoeuvring a vehicle at lower speeds, for example when parking, reversing, negotiating obstacles and the like. Because the beam width is narrow it provides wide coverage at some distance from the vehicle but at distances close to the vehicle, there are blind spots on either side of the beam. Obstacles in the blind spots will not be detected which may be hazardous if the vehicle is under automatic control. Furthermore, at low speeds, or when the vehicle is stationary, it is relatively easy for pedestrians or other vehicles to move into the blind spots and become hazards to an automatically controlled vehicle. Although it is possible to use a beam steering device such as the one described above to scan the beam horizontally from side to side to search for hazards, beam steering cannot scan beams through large angles and blind spots will still be present. For these reasons it has been proposed that certain control systems disable their radar detection means when the vehicle is stationary or moving at slow speed. The control systems activate again when the vehicle moves off from stationary and reaches a pre-determined speed or when the vehicle accelerates to the pre-determined speed.

SUMMARY OF THE INVENTION

According to a first aspect the invention provides a device for changing the divergence of a beam of electromagnetic radiation comprising a body having an electromagnetic aperture for the beam and magnetic means arranged to generate a magnetic gradient across the body which acts on the beam as it passes through the body, characterised in that the magnetic means acts on the electromagnetic aperture such that there is a differential phase delay over the electromagnetic aperture from a centre region to a periphery region of the electromagnetic aperture.

Preferably the magnitude of the phase delay in the central region may be greater than the magnitude of the phase delay at the periphery region. Alternatively, the magnitude of the phase delay in the central region may be less than the magnitude of the phase delay at the periphery region.

The aperture may comprise at least one sub-aperture induced by activation of the magnetic means. Each sub-aperture may have a boundary defined by the magnetic means.

According to a second aspect the invention provides a device for changing the divergence of a beam of electromagnetic radiation comprising a body having an electromagnetic aperture for the beam and magnetic means arranged to generate a magnetic gradient across the body arranged to act on the beam as it passes through the body characterised in that the magnetic means comprises at least one element, a sub-aperture associated with each element and each element defines a boundary of its associated of sub-aperture, and the magnetic means acts on the electromagnetic aperture such that there is a differential phase delay over the electromagnetic aperture from a centre region to a periphery region of the electromagnetic aperture 28.

Preferably the magnetic means may be arranged to induce variations in the magnitude of magnetisation present across the aperture. The magnetic means may be arranged to induce variations in the magnitude of magnetisation present across each sub-aperture. For example, looking at a graph of magnetisation across the aperture or each sub-aperture there may be "kinks", whether peaks or troughs, associated with each element of the magnetic means which is generating magnetic field. This applies whether an average value of gradient in magnetisation across the aperture has a positive or negative non-zero value or is zero. It may be these kinks which define the boundaries of the sub-apertures.

Preferably the magnetic means comprises one or more elongate sources of magnetic field. If there are a plurality of elongate sources, these may be disposed parallel to one another. Most preferably the magnetic means is one or more paths for carrying electric current. Conveniently the or each path is a metal wire. If there are a plurality of paths, current may travel in each path in a direction substantially parallel to the other paths. Alternatively current in some paths may travel in one direction and current in other paths may travel in an opposite direction. Current may travel in opposite directions in adjacent paths. Different amounts of current may be carried by adjacent paths.

Preferably the current carried by the or each path may be altered so as to change the magnitude of the magnetic field generated by the magnetic means and thus the magnetisation induced in the body. The current carried by the or each path may be switched on and off which may switch the beam between a wider beam width and a narrower beam width. Alternatively, the current may be varied in value between on and off states. As a result the degree of kinking in magnetisation across the aperture may be altered and the degree to which the device diverges or converges the beam (that is focusses or defocusses the beam) may also be altered. Individual paths (or groups of individual paths) may be controlled separately. For example, they may be switched on and off and varied independently of one another.

If the device is to diverge the beam in both azimuth and elevation directions, the magnetic means may be in the form of a grid comprising a first set of one or more elongate sources of magnetic field and a second set of one or more elongate sources of magnetic field in which the first set is orientated at an angle of greater than 0° relative to the second set. Preferably the first and second sets are orientated at 90° to each other. The magnitude of the magnetic field of the first and second sets of sources of magnetic field may be independently controllable in order to broaden the beam independently in azimuth and elevation directions.

The beam of radiation may be microwave radiation or may be millimeter wavelength radiation. Most preferably the beam of radiation is generated by a radar system.

The device may effectively be serving as a zoom lens for the beam of radiation. By zoom lens is meant a device which can diverge or converge the beam.

A magnetic material is one in which its internal magnetisation is effected by magnetic field. Preferably the magnetic material is an electrical insulator. It may be a soft ferrite. Ferrite materials may be particularly suitable since they combine high permeability with low conductivity and low losses. Due to the low conductivity, ferrite materials are easily penetrated by microwaves.

The magnetic means may be located adjacent one or more sides of the aperture. Preferably there are two magnetic means. The or each magnetic means may be a single wire or may be one or more coils. Preferably the magnetic means may be provided in one or more pairs on opposite sides of the aperture. If the device is configured to have one magnetic means presenting a North pole on one side of the aperture and the other magnetic means presenting a South pole on another side of the aperture this induces a positive or negative non-zero gradient in magnetisation across the aperture which can be used to steer the beam by an angle θ. Differential operation of the or each pair of magnetic means may change the value of angle θ. If the or each pair of magnetic means both present the same pole (whether North or South) on the sides of the aperture this induces a differential phase delay between a central and a periphery region of the beam as the beam passes through the device. In this way the device may change divergence of a beam without the need to provide separate magnetic means which, for example, divide the aperture into a plurality of sub-apertures. Alternatively, such aperture dividing magnetic means may be provided together with magnetic means.

Preferably there are two gradients in magnetisation which are in directions perpendicular to one another. This enables the direction of the beam to be controlled in azimuth as well as in elevation to achieve conical beam steering. In an embodiment in which the device is used in a surface vehicle (for land or water) elevation control means may still be required. For example, in a land vehicle elevation control may be required to compensate for braking which would cause the front of the vehicle to dip. It may also compensate for the effects of vibration. Elevation scanning may allow information to be gathered that can be used to identify roadside furniture and other objects such as bridges and the like.

The body may comprise a first material which contains at least one region of a second material having a magnetic permeability which is lower than the magnetic permeability of the first material. The or each region may extend from sides of the aperture or sub-apertures. The or each region may extend towards the centre of the aperture or sub-apertures. Preferably the or each region extends about two thirds of the way to the midpoint between the sides of apertures or sub-apertures. Preferably the presence of the or each region having relatively lower permeability causes more of the magnetic flux to be deviated away from the sides of apertures or sub-apertures and towards the centre of the aperture or sub-apertures than would be the case in the absence of the or each region.

Preferably the or each region comprises a slot in the first material containing the second material as an insert or as a filler. The or each slot may taper being thinner at an end nearest to the centre of the aperture or sub-apertures. Preferably the or each slot has a linear taper. Alternatively the taper may be curved.

According to a third aspect the invention provides a control system comprising a radar system which incorporates a device in accordance with the first or second or both aspects of the invention.

According to a fourth aspect the invention provides a vehicle incorporating a control system in accordance with the third aspect of the invention.

Preferably the vehicle is a land vehicle. Alternatively, the vehicle may be waterborne or airborne.

BRIEF DESCRIPTION OF THE DRAWINGS

An embodiment of a microwave device in accordance with the invention will now be described by way of example only with reference to the accompanying drawings in which.

DETAILED DESCRIPTION OF THE PREFERRED EMBODIMENTS

A control system for a vehicle comprises a radar system, having a transmitter and receiver of microwaves and control means for receiving and analysing data provided by the radar system for controlling the speed and direction of the vehicle so as to enable it to travel in an optimum manner. The transmitter comprises a Gunn oscillator and a patch antenna.

The Gunn oscillator is a source of microwaves. The patch antenna launches the microwaves as a divergent beam having a wave front. The divergent beam is focussed by a lens which focusses a central part of the beam and produces a less divergent beam having a plane wave front. The beam is transmitted into free space. The beam is categorised by a parameter referred to as beam width $w_0$. Beam width can be defined as the angular separation of points across the beam which are at power values 3 dB lower than the peak power value of the beam. The beam width of the beam which emerges from the lens is about 3 to 4° at 77 GHz. This frequency is typical for use in a control system to be used in vehicle radar.

The beam may be reflected by vehicles or other objects or-features and is received by the control system. Any suitable form of receiver may be used. The receiver may use the same lens/patch antenna combination as the transmitter or may use another means of receiving reflected signals. The control system obtains data from the reflected signals and uses them to control the vehicle.

Figure 1:
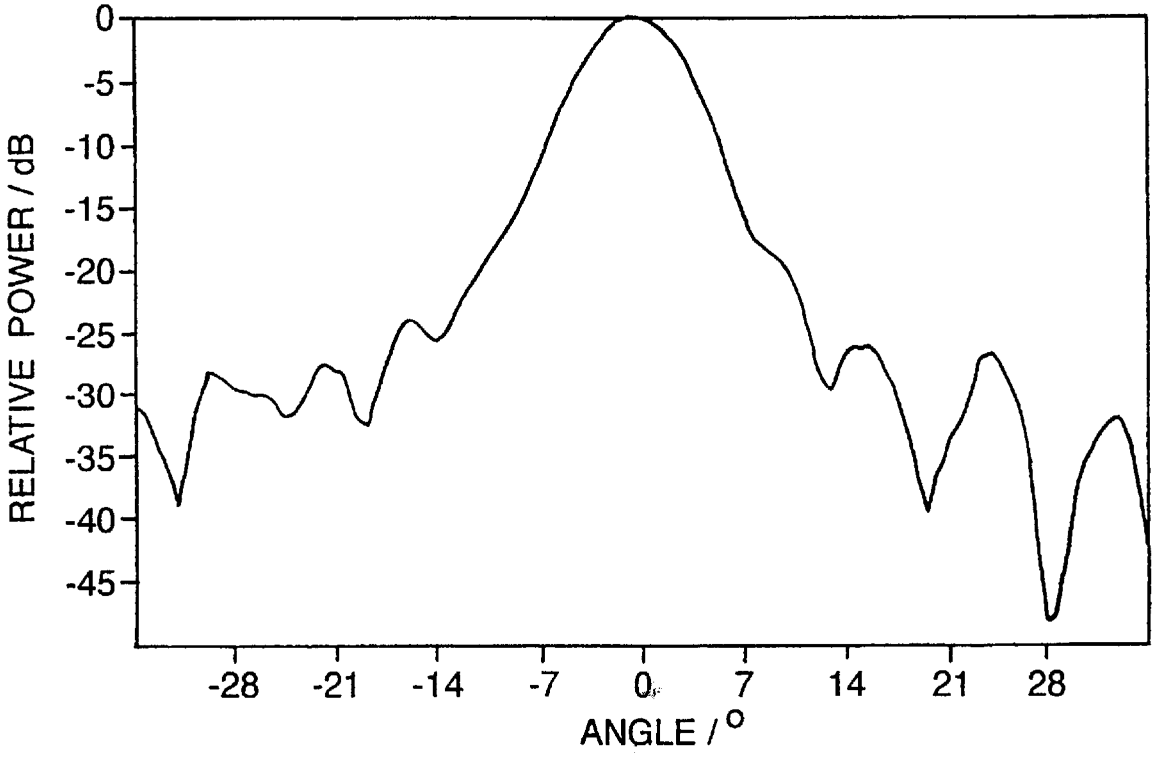
FIG. 1 shows a polar plot of relative, power against scan angle for an undiverged beam.

FIG. 1 is a polar plot of relative power against scan angle for the beam which has been launched into free space from the feed. The values given are simply a relative power level at an angle θ relative to direction of beam propagation. The beam width in this case is about 7°.

Figure 2:
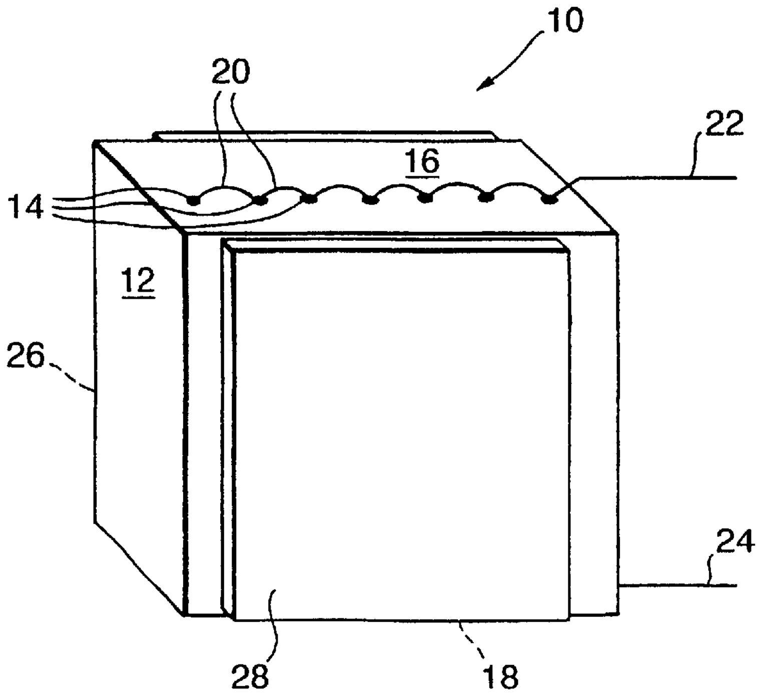
FIG. 2 shows a perspective view of an embodiment of the device.

FIG. 2 shows a perspective view of a device 10 for diverging the beam of microwave radiation. The device 10 comprises a ferrite body 12 typically comprised of a material such as Transtech TTI-3000. A plurality of holes 14 pass through the body 12 from an upper surface 16 to a lower surface 18. Although each hole 14 may carry a single wire 20 for carrying electrical current, in a preferred embodiment each hole is occupied by a plurality of wires, for example two or three wires. In such an arrangement, if each wire carries the same current as a single wire, this provides a greater magnetisation. An additional benefit is that heating effects in the wires may be reduced by having a slightly lower current pass through a greater number of wires. It may be necessary to provide a plurality of power sources, a first of the power sources to power a set of first wires in the holes and others of the power sources to power a set of second and further sets of wires in the holes. The plurality of power sources may be operated independently. Clearly the wires should be insulated from one another in this arrangement. Typically, the wires are made of tungsten. The wires 20 which pass through the body are conveniently connected to leads 22 and 24 in a parallel arrangement as shown in FIG. 1. Alternatively, a single wire is threaded through adjacent holes so that all of the individual sections of wire which pass through the body are arranged in series. The wires 20 have a diameter of 250 μm. The spacing of adjacent wires 20 is chosen to be approximately equal to the wavelength of the beam of microwave radiation passing through the device 10. For microwave radiation having a frequency of 77 GHz, the spacing would be about 4 mm. If the spacing is less than this the wires will reflect at least some of the microwave radiation and operation of the device 10 will be compromised.

In this embodiment, the wires are the magnetic means which serve to change the divergence of the beam.

The device is placed in the path of the beam of microwave radiation such that the beam passes through a rear face 26, through the body 12 and out of a front face 28. To minimise overall loss the front and rear faces are provided with anti-reflection coatings, for example layers of fused silica. The outer dimensions of the body are determined by the width of the beam of microwave radiation which is to pass through it. For use in an application such as vehicle radar the front and rear faces are approximately 70 mm square. The body has a thickness of 15 mm.

Figure 3:
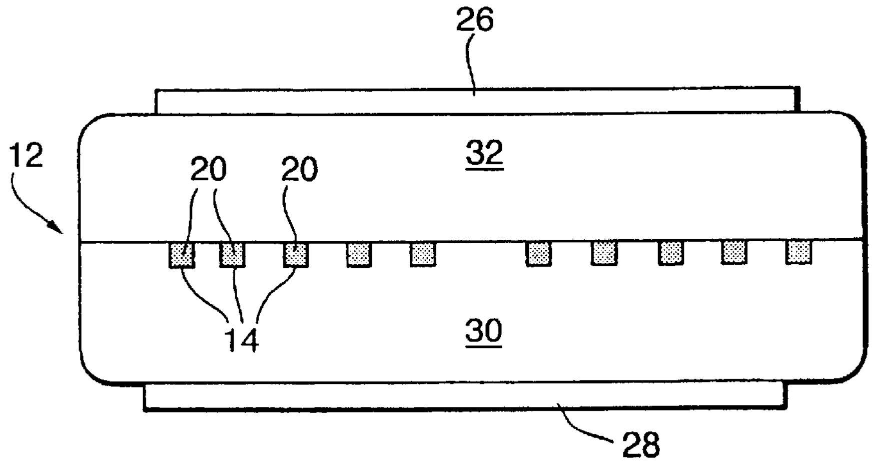
FIG. 3 shows a plan view from above of the device of FIG. 2.

The body is made in two halves, a front half 30 and a rear half 32. This is shown in FIG. 3. Half 30 has scored into it a series of parallel grooves. Half 32 does not have any grooves. When the halves 30 and 32 are joined together to form the body 12 as shown in FIG. 2, the planar surface of half 32 covers the grooves of half 30 so as to form the holes 14 running through the body. Before the halves are joined together to form the body 12, it is convenient for the wires 20 to be laid along the grooves. Following this, the halves are joined together to form the body 12. The halves may be joined securely together using a thin layer of adhesive. The adhesive may also occupy any clearance which is present between the wires 20 and the holes 14 so as to fix the wires 20 securely in the holes 14. In this embodiment there is a single wire 20 per hole 14. When they are carrying current and consequently generating magnetic field, adjacent wires define adjacent sub-apertures.

In operation the wires 20 are energised with DC current typically 5 to 10 A at 2 V. This induces a magnetic field around the wires which induces a magnetisation in the ferrite. In the embodiment of FIGS. 2 and 3 it can be seen that between adjacent wires 20, the magnitude of magnetisation will be relatively high in the region of the wires and relatively low between. Since magnetisation in the material induces a phase delay in the wave front as it passes through the body, there will be a differential delay induced between those parts of the beam which pass through relatively high magnetisation regions and those which pass through relatively low magnetisation regions. As a result, it can be seen that over a sub-aperture bounded by two wires generating magnetic field, that region of the beam will be diverged. Since divergence occurs at each sub-aperture, the net effect of the device 10 is an overall divergence of the beam if coherence is not maintained between adjacent sub-apertures.

Figure 4:
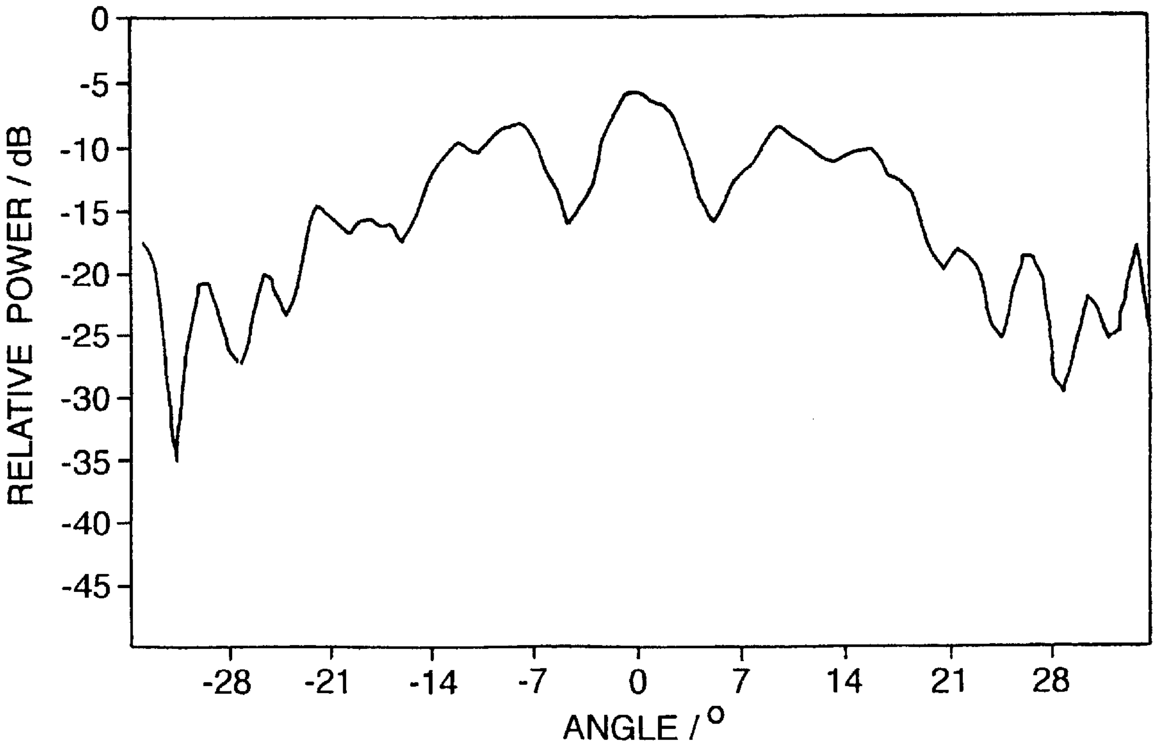
FIG. 4 shows a polar plot of relative power against scan angle for a beam diverged by the device of FIGS. 2 and 3.

FIG. 4 shows a polar plot or relative power against scan angle for a beam which has been diverged using the device of FIGS. 2 and 3. In the particular embodiment of the device used to produce FIG. 4, wires 20 defining sub-apertures across one half of the aperture are configured to have current running in the same direction, whilst across the other half of the aperture the wires are configured to have current running in an opposite direction. This embodiment uses two wires. each of 0.5 mm diameter, per hole. Each wire carries a current of 1 A. As can be seen the effect of magnetising the wires is to broaden the beam considerably from about 7° to about 20°.

Figure 5:
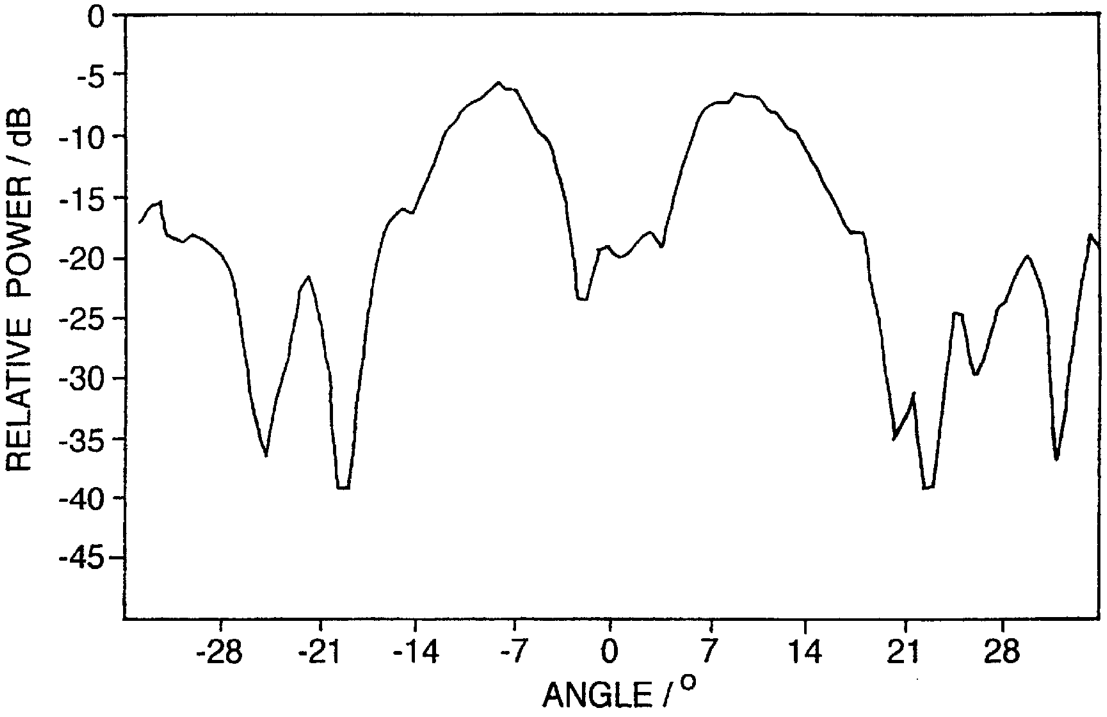
FIG. 5 shows another polar plot of relative power against scan angle for a beam diverged by the device of FIGS. 2 and 3.

FIG. 5 shows another polar plot of relative power against scan angle for a beam which has been diverged using the device of FIGS. 2 and 3. However, unlike FIG. 4, the wires are carrying a much greater current, in this case 10 A. As a consequence the beam has been split into two main sub-beams. Operating a device to alternate between the effect of FIG. 1 and the effect of FIG. 5 may provide a simple way of achieving a beam diverging device. A single main beam is split into two sub-beams such that the single main beam covers a central region on and about bore sight of the transmitter and the two sub-beams cover regions outside this central region.

Figure 6:
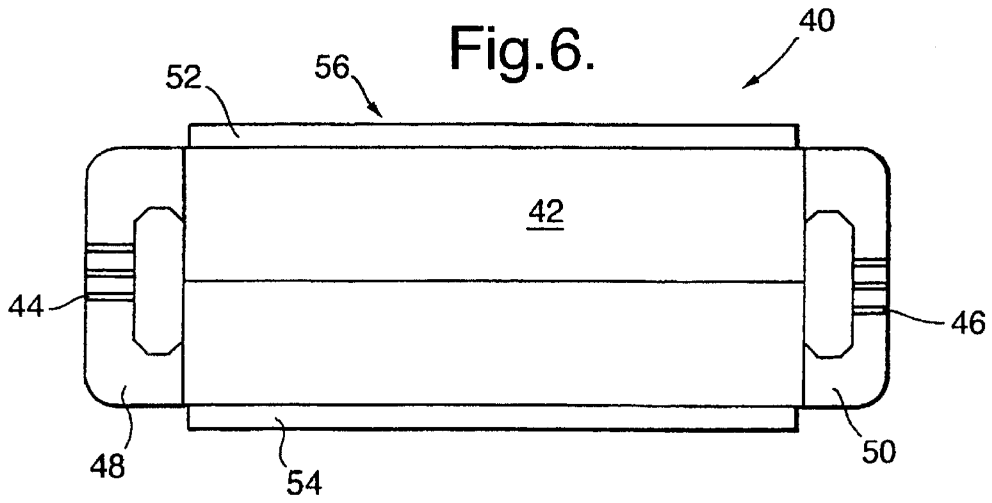
FIG. 6 shows a plan view from above of another embodiment of the device.

FIG. 6 shows a plan view from above of another embodiment of the device. Unlike the embodiment of FIGS. 2 and 3, the device 40 of FIG. 5 does not have magnetic means in the form of wires running through a ferrite body 42. Instead it is provided with magnetic field generating means in the form of coils 44, 46, one coil located on each side of the body 42. Each coil is wound around a respective end piece 48, 50.

If the coils are wound or energised such that both coils present the same magnetic pole on each face 52, 54 of an aperture 56 of the device, there will be a relatively higher value of magnetisation at side regions of the aperture 56 near to the coils 44, 46 than in the centre of the aperture 56. For the reasons discussed above this will cause a beam passing through the aperture 56 to diverge.

Figure 7:
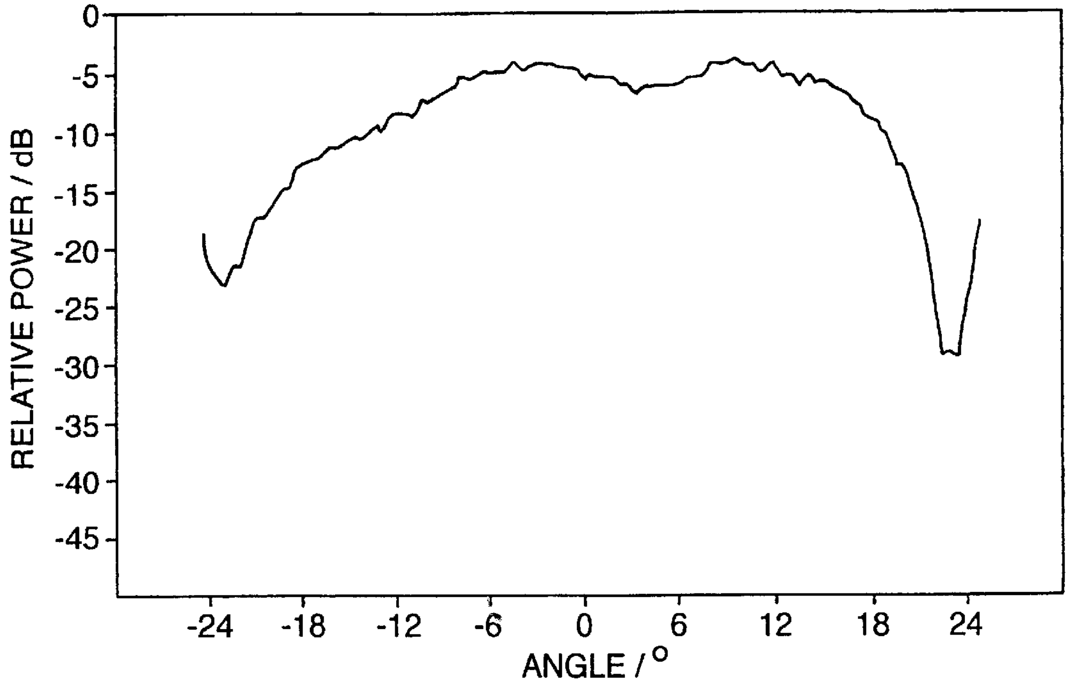
FIG. 7 shows a polar plot of relative power against scan angle for a beam diverged by the device of FIG. 6.

FIG. 7 shows the effect of broadening of beam width due to it beam passing through the device of FIG. 6 in its energised state. As can be seen, the beam width $w_0$ is about 28°. Comparing FIGS. 1 and 7, it can be seen that the coils broaden the beam by more than three times. At a typical operating frequency of 77 GHz, the insertion loss is in the region of 1 dB.

Normally ferrites, or a suitable magnetic material for the frequency range of interest, work with circularly polarised radiation since this is the natural mode of propagation in magnetic materials. However, linearly polarised radiation can also be used with ferrites because it is effectively a combination of two circularly polarised beams rotating in opposite senses.

Figure 8:
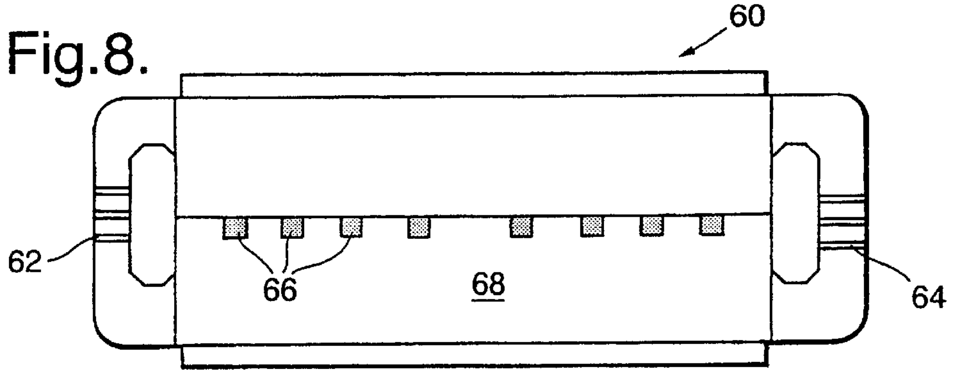
FIG. 8 shows a plan view from above of a further embodiment of the device.

FIG. 8 shows a plan view from above of a further embodiment of the device. The device 60 of FIG. 8 is, in effect, a combination of the device shown in FIGS. 2 and 3 and the device shown in FIG. 6. The device 60 is provided with magnetic field generating means in the form of coils 62, 64 which enable the device to scan a beam. In addition to the coils 62, 64, the device 60 is also provided with magnetic means in the form of wires 66 which run through a ferrite body 68. Sending current through the wires 66 enables the device 60 to cause the beam to diverge in the same manner as has been described in relation to the device of FIGS. 2 and 3.

In the foregoing, the devices described change a plane wave front of incident radiation into a diverging wave front. As a consequence, the devices described are being used as beam broadening devices. However, the devices can be configured so as to change an incident diverging wave front into a plane wave front. This would be equivalent to focussing or collimating the beam.

Figure 9:
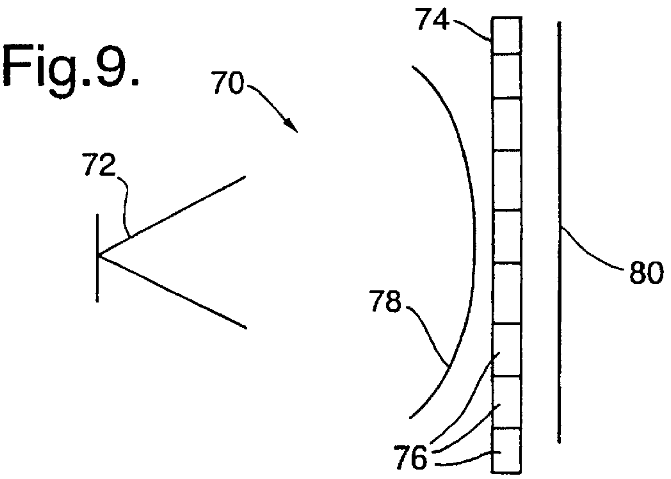
FIG. 9 shows a device being used to focus a diverging wave front into a plane wave front.

FIG. 9 shows a device 70 having a feed or transmitter 72 of microwave radiation and a ferrite body 74. In this embodiment, the ferrite body 74 is divided into a plurality of sub-apertures 76 by magnetic means such as wires passing through the body. The feed 72 emits diverging wave front 78 which is focussed into a plane wave front 80 by the ferrite body 74. The ferrite body 74 may be constructed in accordance with any of the preceding embodiments of the devices discussed. In order to achieve such focussing the magnetisation gradient in the body would need to be created by suitably configured magnetic means.

Figure 10:
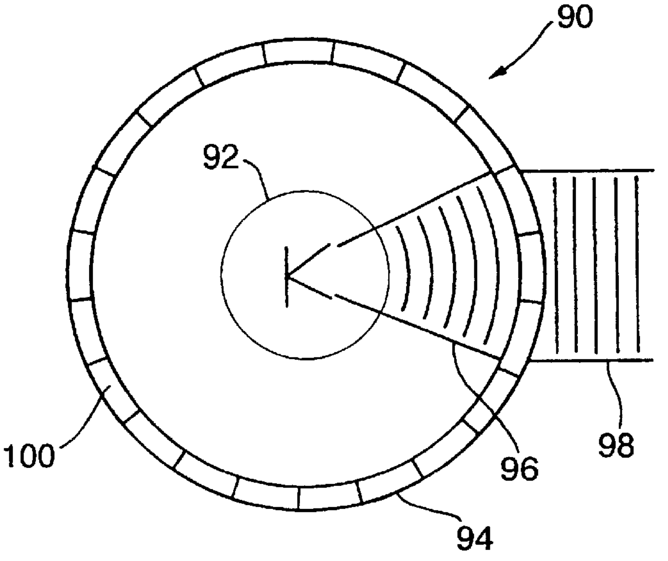
FIG. 10 shows a device being used to focus a diverging wave front from a scanning antenna into a plane wave front.

FIG. 10 shows the principle of FIG. 9 applied to a device 90 incorporating a scanning feed or transmitter 92. The feed or transmitter 92 may scan or rotate mechanically or electronically. It is surrounded by a ferrite body 94 in the shape of a ring. The body 94 has, passing through it, a plurality of current carrying wires which divide the body into a plurality of sub-apertures 100. The wires are controlled in accordance with previous embodiments of the invention in order to generate suitable magnetisation gradients in the body 94 to control the divergence of a wave front.

The feed or transmitter 92 emits a diverging wave front 96. If the body 94 is suitably magnetised it can focus the diverging wave front into a plane wave front 98 over a complete 360° C. revolution of the feed or transmitter 92. The body 94 focusses the wave front in a plane perpendicular to the axis of rotation of the feed or transmitter 92, that is in a plane occupied by the body 94. Such a device would be suitable for an application in which it is used to focus a beam in one plane only, typically azimuth. Such an effect would be suitable for antennae which only rotate about a single axis. If the body 94 is in the shape of a doughnut with the scanning feed or transmitter located at its centre, then as the beam encounters the body, it encounters a curved surface acting as a lens both in elevation and azimuth directions. Therefore, a doughnut-shaped body 94 is able to focus in both of those directions.

Although FIGS. 9 and 10 have been discussed in terms of their ability to focus a diverging beam, they can, of course, also be used to defocus non-diverging beams or to cause an already diverging beam to diverge more.

Figure 11:
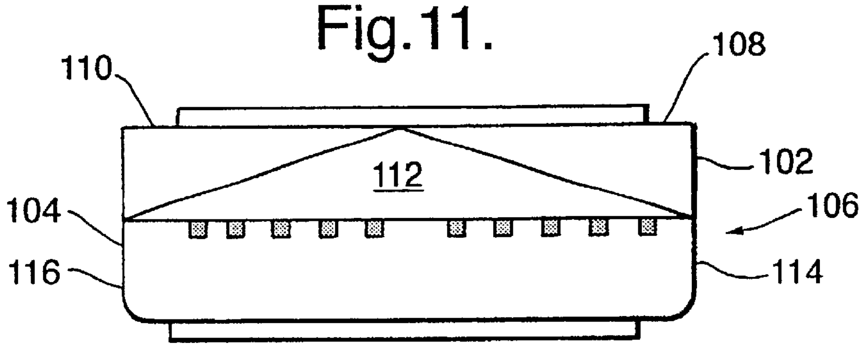
FIG. 11 shows a plan view from above of a still further embodiment of the device.
Figure 12:
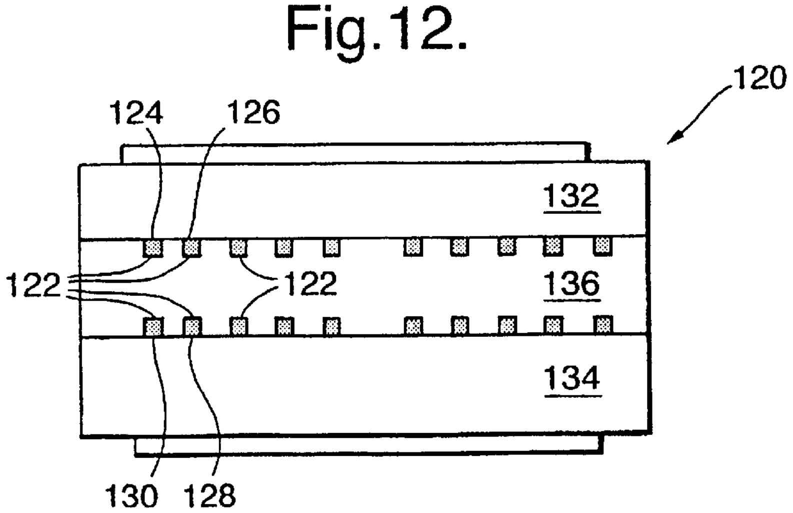
FIG. 12 shows a plan view from above of yet a still further embodiment of the device.

FIGS. 11 to 13 show constructional variations of the embodiments discussed above. For example in FIG. 11, one half 102 of a body 104 of a device 106 is of composite construction having wedge portions 108 and 110 of non-magnetic material attached to a body part 112 of magnetic material. The wedge portions 108 and 110 have a similar dielectric constant to the magnetic material used to form the body part 112. As magnetic material of the body part 112 becomes thinner towards sides 114 and 116 of the device, the magnetic circuit becomes less efficient. As a consequence the composite construction helps tailor a desired magnetisation gradient from one side of the body to the other.

FIG. 12 shows an embodiment of a device 120 which has more than one row of holes 122 in its body and thus more than one row of wires. This provides for more flexibility in configuring wires and thus magnetisation. For example groups of four holes such and 124, 126, 128 and 130 can be wound to provide an individual coil arrangement. In one such arrangement a wire passes down hole 124, up hole 126, down hole 130 and then up hole 128. Individual groups of four holes may be wound in a similar way to produce individually controllable coil arrangements each of which can have passed through it an individually controllable current to achieve an individual magnetisation. In the example of winding described above, individual coil arrangements would direct a strong component of magnetic field between front and rear faces of the body. This arrangement may work more effectively than a simple disposition of wires such as serial winding through adjacent holes.

The device 120 is provided with three layers, outer plates of magnetic material 132 and 134 and a middle part or former 136. The wires can be wound directly onto the former and then the device 120 can be assembled. The former may be of magnetic material but may equally be non-magnetic material. A non-magnetic material provides a reluctance path in a direction perpendicular to the front and rear faces and thus encourages magnetic field passing through the body to be more parallel to this perpendicular direction. The former 136 ideally has the same dielectric constant as the magnetic material of the outer plates 132 and 134. However, in another embodiment the outer plates 132 and 134 could be separated by an air gap. In such an embodiment the former 136 would not be present and so some alternative method of winding the wires would need to be employed.

It should also be noted that the spacing of the holes is not uniform across the aperture from one side to an opposite side. Although embodiments of the device 120 may exist having both uniform and non-uniform spacing of holes, non-uniform spacing may be preferred in order to produce a series of sub-apertures having different sizes for the purpose of destroying coherence across the wave front of the beam in order to obtain significant divergence having a relatively uniform power distribution across the resultant diverged beam. It may be that all of the spacings between adjacent holes are different or it may be that at least two spacings are the same and at least one other spacing is different. Although it is intended for individual wires or individual groups of wires to be supplied with individually controllable current supplies to disrupt coherence, if the spacings of the holes are chosen correctly a single wire wound through each hole in turn may result in an embodiment which disrupts coherence sufficiently without the need to provide individually controllable current supplies.

The embodiments of the devices described above may be used in conjunction with a conventional lens antenna in an arrangement in which the lens antenna emits energy in a beam having a plane wave front into free space in a desired propagation direction. Such a beam encounters the device, and diverges as it passes through it. Alternatively the lens may be omitted and the device may serve as a combined lens and diverging device. In this embodiment the feed, such as a patch antenna, would feed a divergent beam directly into the device.

I claim:

1. A device for changing the divergence of a beam of electromagnetic radiation, comprising: a structure having an internal opening that extends through the structure, and an electromagnetic aperture through which the beam passes; and magnetic means extending through the internal opening in the structure, for controlling a width of the beam by generating a magnetic gradient across the electromagnetic aperture and producing a differential phase delay across different regions of the electromagnetic aperture.

2. The device according to claim 1, wherein the phase delay at a central region of the electromagnetic aperture has a magnitude which is greater than a magnitude of a phase delay at a periphery region of the electromagnetic aperture.

3. The device according to claim 1, wherein the phase delay at a central region of the electromagnetic aperture has a magnitude which is less than a magnitude of a phase delay at a periphery region of the electromagnetic aperture.

4. The device according to claim 1, wherein the structure is a ferrite body having additional openings extending through the structure, and wherein the magnetic means includes electrical current—carrying wires located within the openings.

5. The device according to claim 1, wherein the structure includes a body and end parts at opposite ends of the body, and wherein the internal opening extends through one of the end parts, and further comprising another internal opening extending through the other of the end parts, and wherein the magnetic means includes electrical current—carrying coils extending through the internal openings.

6. A device for changing the divergence of a beam of electromagnetic radiation, comprising: a structure having an internal opening that extends through the structure, and an electromagnetic aperture having a plurality of sub-apertures through which the beam passes; and magnetic means including a plurality of elements respectively associated with the sub-apertures, each element defining a boundary of its associated sub-aperture, at least one element extending through the internal opening in the structure, for controlling a width of the beam by generating a magnetic gradient across the electromagnetic aperture and producing a differential phase delay across different regions of the electromagnetic aperture.

7. The device according to claim 6, wherein the magnetic means is operative for inducing variations in a magnitude of magnetization present across the electromagnetic aperture.

8. The device according to claim 6, wherein the magnetic means is operative for inducing variations in a value of magnetization present across each sub-aperture.

9. The device according to claim 6, wherein said at least one element comprises at least one elongate source of a magnetic field.

10. The device according to claim 6, wherein the plurality of elements comprise elongate sources of magnetic fields disposed parallel to one another.

11. The device according to claim 6, wherein each element includes at least one path for carrying electric current.

12. The device according to claim 11, wherein the magnetic means is operative for altering the current carried by said at least one path to change a magnitude of a magnetic field generated by the magnetic means and thus a magnetization induced in the structure.

13. The device according to claim 6, wherein the magnetic means is in a form of a grid comprising a first set of an elongate source of magnetic field and a second set of an elongate source of magnetic field, and wherein the first set is oriented at an angle of greater than 0° relative to the second set.

14. The device according to claim 13, wherein the magnetic means is operative for independently controlling a magnitude of a magnetic field of each of the first and second sets in order to broaden the beam width independently in azimuth and elevation directions.

15. The device according to claim 6, wherein said at least one element is located adjacent at least one side of the electromagnetic aperture.

16. The device according to claim 15, wherein there are two elements.

17. The device according to claim 16, wherein the two elements are provided in at least one pair on opposite sides of the electromagnetic aperture.

18. The device according to claim 6, wherein the beam of radiation is microwave radiation.

19. The device according to claim 6, wherein the beam of radiation is of millimeter wavelength radiation.

20. A control system, comprising a radar system incorporating a device for changing the divergence of a beam of electromagnetic radiation, comprising: a structure having an internal opening that extends through the structure, and an electromagnetic aperture through which the beam passes; and magnetic means extending through the internal opening in the structure, for controlling a width of the beam by generating a magnetic gradient across the electromagnetic aperture and producing a differential phase delay across different regions of the electromagnetic aperture.

21. A vehicle incorporating a control system comprising a radar system incorporating a device for changing the divergence of a beam of electromagnetic radiation, comprising: a structure having an internal opening that extends through the structure, and an electromagnetic aperture through which the beam passes; and magnetic means extending through the internal opening in the structure, for controlling a width of the beam by generating a magnetic gradient across the electromagnetic aperture and producing a differential phase delay across different regions of the electromagnetic aperture.

22. The vehicle according to claim 21, wherein the vehicle is a land vehicle.

23. The vehicle according to claim 21, wherein the vehicle is waterborne.

24. The vehicle according to claim 21, wherein the vehicle is airborne.

* * * * *